United States Patent
Andrews et al.

(10) Patent No.: US 10,516,759 B2
(45) Date of Patent: Dec. 24, 2019

(54) SYSTEM AND METHOD FOR CENTRALIZED MANAGEMENT OF SOFTWARE SERVICES

(71) Applicant: DELL PRODUCTS, LP, Round Rock, TX (US)

(72) Inventors: Carlton A. Andrews, Austin, TX (US); Joseph Kozlowski, Hutto, TX (US); Girish S. Dhoble, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 208 days.

(21) Appl. No.: 15/350,936

(22) Filed: Nov. 14, 2016

(65) Prior Publication Data

US 2018/0139308 A1    May 17, 2018

(51) Int. Cl.
*H04L 29/08* (2006.01)
*G06F 11/14* (2006.01)
*H04L 12/24* (2006.01)

(52) U.S. Cl.
CPC .......... *H04L 67/34* (2013.01); *G06F 11/1402* (2013.01); *H04L 41/5041* (2013.01); *H04L 41/5096* (2013.01); *H04L 67/04* (2013.01)

(58) Field of Classification Search
CPC ......... H04L 67/42; H04L 67/04; H04L 67/16; H04L 67/34; H04L 63/0815; H04L 63/0884; H04L 41/5041; H04L 41/5096; G06F 21/00; G06F 21/31; G06F 21/41; G06F 21/554; G06F 11/1402
See application file for complete search history.

(56) References Cited

U.S. PATENT DOCUMENTS

| | | | | |
|---|---|---|---|---|
| 9,854,063 | B2* | 12/2017 | Borzycki | G06F 21/6218 |
| 2007/0127400 | A1 | 6/2007 | McKibben et al. | |
| 2011/0277027 | A1* | 11/2011 | Hayton | H04L 63/0815 |
| | | | | 726/8 |
| 2013/0254401 | A1* | 9/2013 | Marshall | G06F 21/6218 |
| | | | | 709/226 |
| 2014/0123306 | A1* | 5/2014 | Jung | H04L 41/5054 |
| | | | | 726/27 |
| 2014/0129707 | A1* | 5/2014 | Baumback | G06F 9/5027 |
| | | | | 709/224 |
| 2014/0189119 | A1* | 7/2014 | Stuntebeck | H04L 67/16 |
| | | | | 709/225 |

(Continued)

FOREIGN PATENT DOCUMENTS

WO    WO 2012/131279 A1    10/2012

*Primary Examiner* — Todd L Barker
(74) *Attorney, Agent, or Firm* — Larson Newman, LLP

(57) ABSTRACT

Software services are managed from a single machine performing a service. Service providers offering SaaS applications solicit the single machine. Each service provider provides roles and device requirements for performing the corresponding SaaS. The single machine maintains a database that logs the software services offered by the service providers. Whenever a software service is needed, the single machine inventories its client devices for their resource capabilities and compares to the device requirements in the database. The database reveals the client machine(s) that best performs the role for the corresponding SaaS. Software services are thus integrated and managed from the single machine, thus allowing software services to be efficiently and quickly selected as network resources emerge.

11 Claims, 18 Drawing Sheets

(56) References Cited

U.S. PATENT DOCUMENTS

| | | | |
|---|---|---|---|
| 2015/0052247 A1* | 2/2015 | Threefoot | H04L 67/10 709/225 |
| 2015/0134840 A1 | 5/2015 | Thompson et al. | |
| 2015/0188779 A1* | 7/2015 | McCanne | H04L 63/10 709/203 |
| 2016/0323291 A1* | 11/2016 | Stuntebeck | H04L 63/102 |
| 2017/0312626 A1* | 11/2017 | Colenbrander | A63F 13/355 |

* cited by examiner

SYSTEM AND METHOD FOR CENTRALIZED MANAGEMENT OF SOFTWARE SERVICES

FIELD OF THE DISCLOSURE

The present disclosure generally relates to information handling systems, and more particularly relates to centralized management of software services.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

Software services are managed from a single machine performing a management service. When an endpoint client device determines that a resource is needed, the client device sends an advertisement to the single machine performing the management service. The advertisement describes the resource that is needed. The advertisement may even specify any hardware and/or software capabilities that the client device currently possesses. The client device, in plain words, solicits the single machine to arrange the needed resource. The single machine, performing the management service, surveys service providers offering software-as-a-service (SaaS) applications. That is, the management service identifies a SaaS solution that best satisfies the resource needed by the client device. The management service then instructs the service provider to deploy the SaaS solution to the client device. The management service has thus efficiently and quickly orchestrated the resource in response the identified need.

Software backup provides an example. Suppose the client device is a smartphone or other mobile device. As the reader likely understands, mobile devices can be abused from daily use (dropped phones, broken screens, or bent cases). The smartphone may thus autonomously and/or intelligently determine that a backup service is lacking and needed. The smartphone may thus solicit the management service to orchestrate the backup service. The single machine may thus survey any of the service providers offering the backup service. As the reader may also understand, there may be many different backup services offered by many different vendors. Each different backup service may have different features, functions, and capabilities. The management service identifies the backup service that best suits the client device (as later paragraphs will explain). The management service then instructs the corresponding service provider to deploy the backup service to the client device. The management service may thus handoff the deployment details and orchestrate other needs for other clients.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
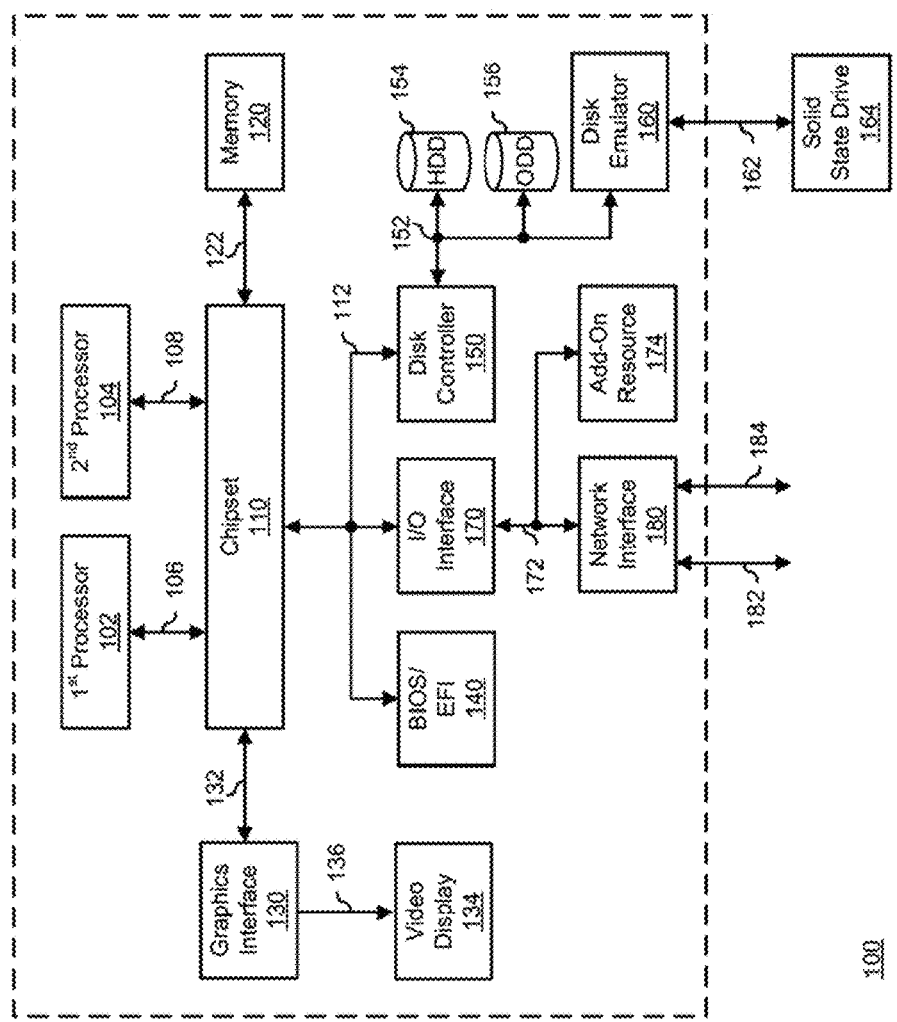
FIG. 1 is a block diagram illustrating an information handling system according to an embodiment of the present disclosure.

FIG. 1 illustrates a generalized embodiment of an information handling system 100, according to exemplary embodiments. For purpose of this disclosure the information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, the information handling system 100 can be a personal computer, a laptop computer, a smart phone, a tablet device or other consumer electronic device, a network server, a network storage device, a switch router or other network communication device, or any other suitable device and may vary in size, shape, performance, functionality, and price. Further, the information handling system 100 can include processing resources for executing machine-executable code, such as a central processing unit (CPU), a programmable logic array (PLA), an embedded device such as a System-on-a-Chip (SoC), or other control logic hardware. The information handling system 100 can also include one or more computer-readable medium for storing machine-executable code, such as software or data. Additional components of the information handling system 100 can include one or more storage devices that can store machine-executable code, one or more communications ports for communicating with external devices, and various input and output (I/O) devices, such as a keyboard, a mouse, and a video display. The information handling system 100 can also include one or more buses operable to transmit information between the various hardware components.

The information handling system 100 can include devices or modules that embody one or more of the devices or modules described above, and operates to perform one or more of the methods described above. The information handling system 100 includes one or more processors (such as reference numerals 102 and 104), a chipset 110, a memory 120, a graphics interface 130, a basic input and output system/extensible firmware interface (BIOS/EFI) module 140, a disk controller 150, a disk emulator 160, an input/output (I/O) interface 170, and a network interface 180. Processor 102 is connected to chipset 110 via processor interface 106, and processor 104 is connected to chipset 110 via processor interface 108. Memory 120 is connected to chipset 110 via a memory bus 122. Graphics interface 130 is connected to chipset 110 via a graphics interface 132, and provides a video display output 136 to a video display 134. In a particular embodiment, the information handling system 100 includes separate memories that are dedicated to each of the processors 102 and 104 via separate memory interfaces. An example of the memory 120 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 140, disk controller 150, and I/O interface 170 are connected to chipset 110 via an I/O channel 112. An example of I/O channel 112 includes a Peripheral Component Interconnect (PCI) interface, a PCI-Extended (PCI-X) interface, a high-speed PCI-Express (PCIe) interface, another industry standard or proprietary communication interface, or a combination thereof. Chipset 110 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/EFI module 140 includes BIOS/EFI code operable to detect resources within information handling system 100, to provide drivers for the resources, initialize the resources, and access the resources.

Disk controller 150 includes a disk interface 152 that connects the disk controller 150 to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits a solid-state drive 164 to be connected to information handling system 100 via an external interface 162. An example of external interface 162 includes a USB interface, an IEEE 1194 (Firewire) interface, a proprietary interface, or a combination thereof Alternatively, solid-state drive 164 can be disposed within information handling system 100.

I/O interface 170 includes a peripheral interface 172 that connects the I/O interface to an add-on resource 174 and to network interface 180. Peripheral interface 172 can be the same type of interface as I/O channel 112, or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral channel 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board or add-in card disposed within information handling system 100, a device that is external to the information handling system, or a combination thereof.

Network interface 180 represents a NIC disposed within the information handling system 100, on a main circuit board of the information handling system 100, integrated onto another component such as chipset 110, in another suitable location, or a combination thereof. Network interface device 180 includes network channels 182 and 184 that provide interfaces to devices that are external to information handling system 100. In a particular embodiment, network channels 182 and 184 are of a different type than peripheral channel 172 and network interface 180 translates information from a format suitable to the peripheral channel to a format suitable to external devices. An example of network channels 182 and 184 includes InfiniBand channels, Fibre Channel channels, Gigabit Ethernet channels, proprietary channel architectures, or a combination thereof. Network channels 182 and 184 can be connected to external network resources (not illustrated). The network resource can include another information handling system, a data storage system, another network, a grid management system, another suitable resource, or a combination thereof.

Figure 2:
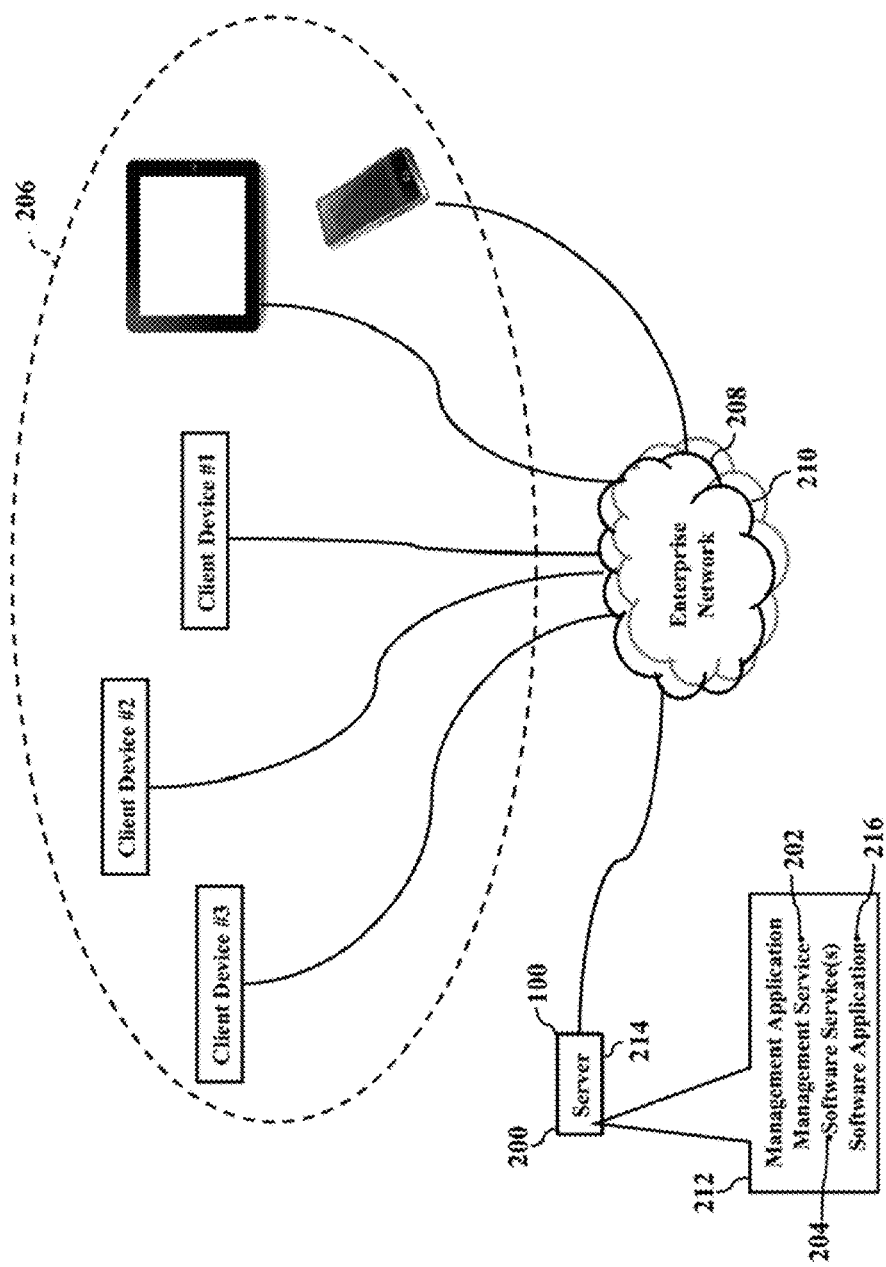
FIGS. 2-5 are simplified illustrations of centralized service management, according to exemplary embodiments.

FIGS. 2-5 are simplified illustrations of centralized service management, according to exemplary embodiments. Here the information handling system 100 may be configured as a server 200 that provides a management service 202. The management service 202 oversees software deployment and diverse software services 204 for client devices 206 communicating via a communications network 208. FIG. 2 particularly illustrates an enterprise network 210, which may be simply considered as a private communications network operated on behalf of a company, corporation, government, or other enterprise. Regardless, the server 200 executes a management application 212 that provides the management service 202. The management application 212 causes the server 200 to act as a single management console 214 that determines which of the software services 204 is suitable for the resource needs by any one or more of the client devices 206. These service and deployment decisions were conventionally handled by many different vendor solutions executed by many different computer platforms. The many different vendor solutions and computer platforms frustrated both customers and vendors. Exemplary embodiments, instead, present the management service 202 that unifies, integrates, and centralizes all customer management of the software services 204.

Figure 3:
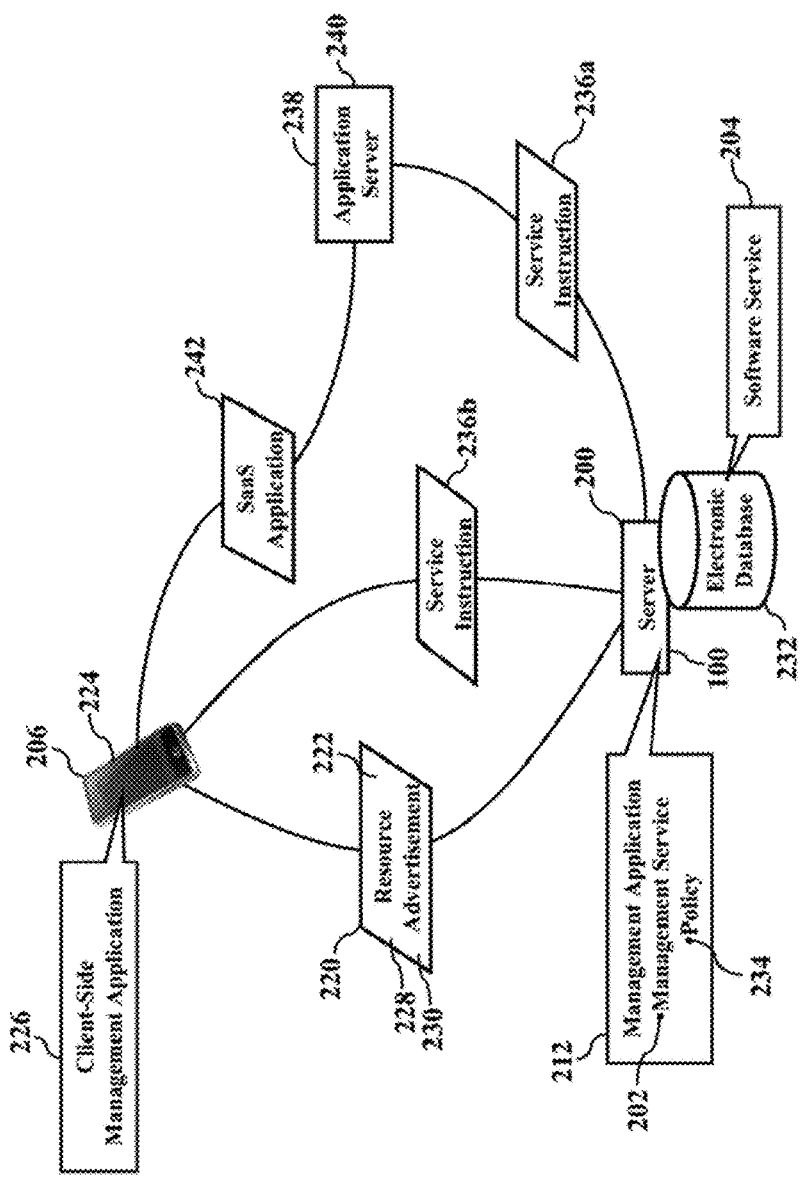

As FIG. 3 illustrates, exemplary embodiments may solicit resource needs. Here the client device 206 may send a resource advertisement 220 to the information handling system 100 (acting as the server 200). The resource advertisement 220 specifies or describes a resource 222 that is needed by the client device 206. FIG. 3 illustrates the client device 206 as a mobile smartphone 224, which most readers are thought familiar. The client device 206, though, may be any processor-controlled device, as later paragraphs will explain. Regardless, the smartphone 224 executes a client-side management application 226 that cooperates with the management application 212 executed by the server 200. The client-side management application 226 causes the smartphone 224 to survey its hardware capabilities 228 and software capabilities 228 to determine that the resource 222 is lacking and needed. The client-side management application 226 then instructs or causes the smartphone 224 to send the resource advertisement 220 to a network address (e.g., Internet protocol address) associated with the server 200. The resource advertisement 220 specifies or describes the resource 222 that is needed by the smartphone 224.

The server 200 may be a match maker. When the server 200 receives the resource advertisement 220, the management application 212 causes the server 200 to inspect the resource advertisement 220 for the resource 222 requested by the smartphone 224. The server 200 may then determine which one of the software services 204 best suits the resource 222 identified by the smartphone 224. That is, exemplary embodiments match the smartphone 224 to the software service 204 that best or minimally suits the hardware capabilities 228 and/or the software capabilities 228 reported by the smartphone 224. The resource advertisement 220, in other words, may specify processor, memory, networking, and other device characteristics associated with the smartphone 224. The resource advertisement 220 may also describe what software applications are currently stored, executable, and/or accessible to the smartphone 224.

The server 200 may then consult an electronic database 232. The electronic database 232 stores information describing the different software services 204 offered by different vendors and/or service providers. The server 200 may thus determine which one of the software services 204 best suits the resource 222 identified by the smartphone 224. The management application 212 may also consult or execute any policy 234 (e.g., rules, instructions, constraints) for selecting which software service 204 corresponds to the resource 222 identified by the smartphone 224. While the policy 234 may be as detailed or elaborate as desired, this disclosure will simply utilize the hardware capabilities 228 and/or the software capabilities 228 reported by the smartphone 224. That is, the management application 212 simply instructs the server 200 to identify the software service 204 that satisfies the hardware capabilities 228 and/or the software capabilities 228 available to the smartphone 224. The policy 234, of course, may implement much more detailed logical requirements that affect selection of the software service 204.

The server 200 may then orchestrate the resource 222. Once the server 200 identifies the software service 204 (referenced by the electronic database 232), the server 200 may then order deployment and provisioning. The server 200, for example, may send a service instruction 236a to a service provider 238 selected to provide the software service 204. FIG. 3, for example, illustrates an application server 240 that stores or manages a software (SaaS) application 242 that provides the software service 204. The service instruction 236a instructs the service provider 238 (via the application server 240) to download the SaaS application 242 to the network address (such as Internet protocol address) associated with the smartphone 224. The service instruction 236b may also be sent to the smartphone 224, thus instructing the client-side management application 226 to accept the SaaS application 242. The management service 202, in other words, orders the smartphone 224 and the application server 240 to cooperate in deploying and provisioning the SaaS application 242.

Figure 4:
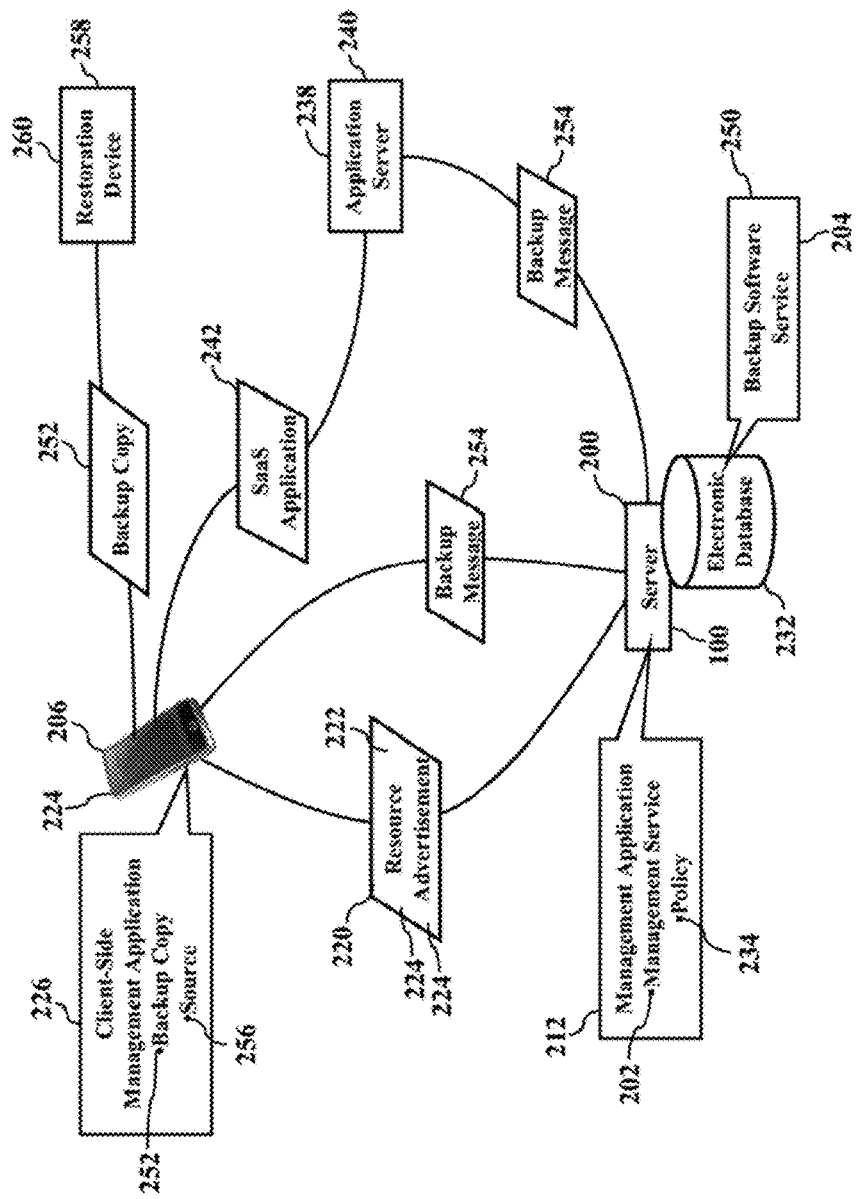

FIG. 4 illustrates an exemplary solution. Here exemplary embodiments are simply explained using a backup software service 250. That is, even though exemplary embodiments are applicable to any software service 204, most readers are thought familiar with network-based or cloud-based backup services. The backup software service 250 protects the client device 206 (such as the smartphone 224) from data loss. Should the client-side management application 226 determine that the smartphone 224 lacks a restoration software or strategy for backing up its memory contents, the client-side management application 226 may solicit the server 200. The smartphone 224 thus sends the resource advertisement 220 requesting the backup software service 250. Although not required, the resource advertisement 220 may also specify the hardware capabilities 228 and/or software capabilities 228 available to the smartphone 224.

The server 200 may then determine the appropriate backup software service 250. As the reader likely understands, many different companies offer file backup services that would create a backup copy 252 of the files stored by the smartphone 224. Some of these file backup services may be better suited to particular machines or to specific performance metrics. The electronic database 232 may thus contain many entries detailing parameters and/or requirements associated with different file backup services. The management service 202 may thus select the backup software service 250 that best suits, or is compatible with, the hardware capabilities 228 and/or the software capabilities 228 reported by the smartphone 224.

The server 200 may then order up the backup software service 250. The server 200 sends a backup message 254 to the smartphone 224 and to the vendor's application server 240 providing the backup software service 250. The backup message 254 instructs the smartphone 224 and/or the application server 240 to arrange the backup software service 250. The backup message 254, in other words, instructs the application server 240 to download backup software (the SaaS application 242) to the smartphone 224. The backup message 254 may optionally include other provisioning details, such as identifying the smartphone 224 as a source 256 for the backup software service 250. The backup message 254 may also identify or specify other provisioning details (such as a restoration device 258 acting a destination 260 for the backup copy 252). The backup message 254, in other words, may identify the network addresses (e.g., Internet protocol addresses) for provisioning the backup software service 250. The backup message 254 may thus instruct the restoration device 258 to reserve its available memory, and the backup message 254 may instruct the smartphone 224 to generate the backup copy 252. The smartphone 224 may thus send the backup copy 252 as a stream of data to the network address associated with the restoration device 258. Exemplary embodiments, in plain words, have thus identified a need for the backup software service 250 and automatically provisioned the details.

Exemplary embodiments thus present an elegant solution. Once the client device 206 (such as the smartphone 224) identifies its needed resource 222, the client device 206 may be agnostic to the actual service provider. The client device 206, in other words, may not care about the vendor, and the client device need not participate in selecting the vendor. The management service 202 relieves the client device 206 of evaluating all the different service providers 238 offering all the different software services 204. The management service 202 also relieves the client device 206 of selecting which software service 204 best satisfies or resolves the policy 234 for evaluating all the different service providers. The client device 206 merely advertises its needed resource 222 and allows the management service 202 to carry the burden.

Figure 5:
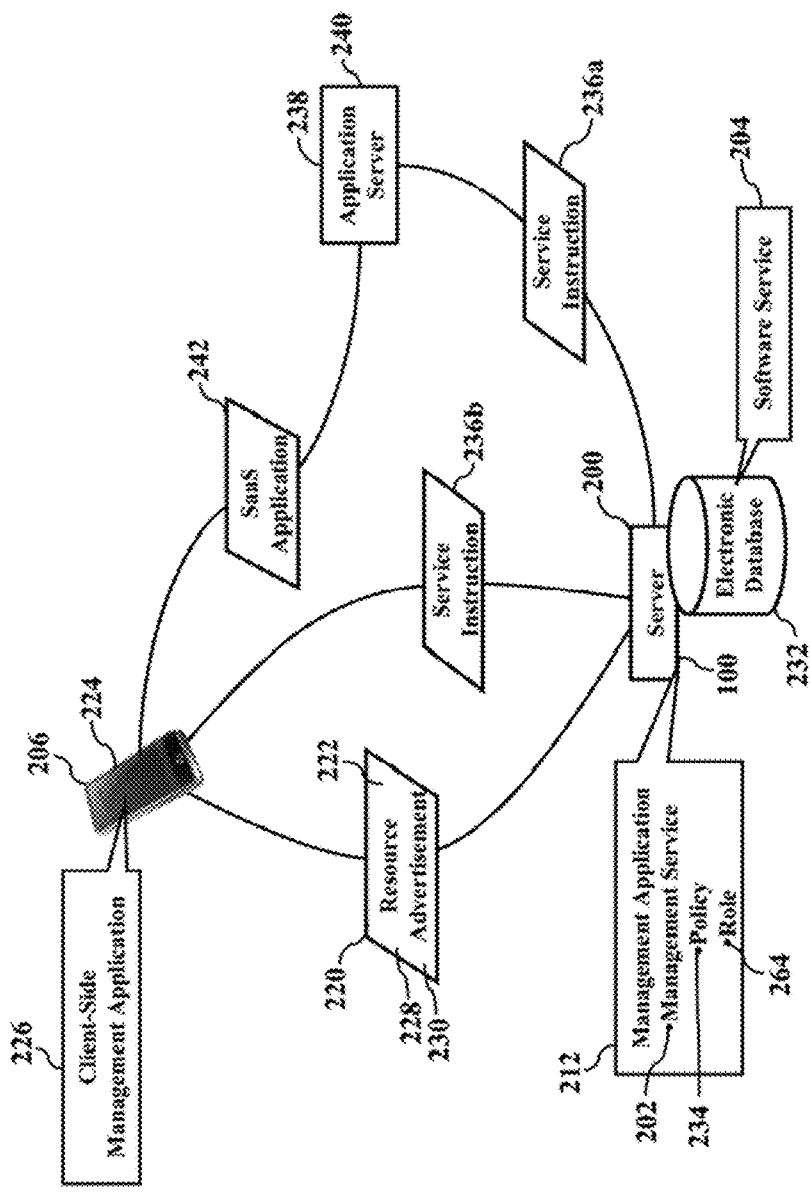

FIG. 5 further illustrates the policy 234. The policy 234 logically defines or describes rules, instructions, and/or prerequisites associated with the management service 202. The above paragraphs simply explained the policy 234 as the hardware capabilities 228 and/or the software capabilities 228 determined by the client device 206. Exemplary embodiments may thus use the policy 234 to determine the software service 204 that satisfies the resource 222. The policy 234, though, may also specify what role 264 the client device 206 plays, or performs, in the software service 204. The server 200, providing the management service 202, may thus assign different roles 264 to different client devices 206. Each client device 206 performs its associated role 264, thus allowing the client devices 206 to cumulatively execute the software service 204. The policy 234 and the role 264 may even be associated with the corresponding software application 242. Different client devices 206, in other words, may be instructed to download different software applications 216 in order to play or perform its corresponding role 264. The management service 202 may thus coordinate the deployment and provisioning of different software applications 216 to ensure each different client device 206 timely executes its portion of the overall software service 204.

The policy 234 may also include prerequisites of use. The management service 202 may impose conditions or restrictions that must first be satisfied. If the client device 206, the service provider 238, and/or the software service 204 fails to achieve or to match any prerequisites, the management service 202 may restrict or deny participation. A prerequisite of use, for example, may be authentication and/or affiliation. If the client device 206 cannot successfully authenticate to the management service 202, access may be denied. Moreover, the management service 202 may also require that the client device 206 be preapproved, especially in an enterprise environment. Other prerequisites of use may impose vendor requirements before the service provider 238 may participate (such as having the software service 204 listed and/or detailed in the electronic database 232).

Exemplary embodiments may be applied to any software service 204. As the reader may understand, operators of the enterprise network 210 (illustrated in FIG. 2) may utilize many different software services 204 provided by many different service providers 238. For example, the client devices 206 may require external security services, backup services, mobile networking services, cloud or Internet-based productivity services (such as email, word processing, and calendaring applications), social networking, messaging services, and many more SaaS applications 242. These software services 204 are external to the client device 206, as only being accessible via the enterprise network 210. Any cloud-based service, for example, is an example of the software service 204. The reader may thus understand that there may be many different service providers 238 from which to choose, with some service providers 238 offering competing SaaS applications 242. While this disclosure may thus integrate any service offering, this disclosure will mainly discuss the software services 204. The software service 204 may thus be the Saas application 242 that is accessible via the enterprise network 210 (such as a local area network), a private wide-area cellular network, and/or the public Internet.

Exemplary embodiments include a service-to-service interface. The management service 202 (provided by the information handling system 100 acting as the server 200) coordinates the software services 204 provided by the different service providers 238. The management service 202 may thus itself be one of the software services 204 offered by any of the service providers 238. The management service 202 is thus a service provider-to-service provider interface for coordinating deployment and configuration of the different software services 204. The management service 202 may even target a single client device 206 as an endpoint for two (2) or more external services, thus brokering deployment and provisioning of multiple service applications 242 to ensure the single client device 206 executes its multiple roles 264.

FIGS. 2-5 are simplified illustrations. The reader should understand that the typical enterprise network 210 may have hundreds or even thousands of client machines requiring many software services 204. Such a massive enterprise network 210 is simply too complicated to explain and to illustrate. This disclosure thus illustrates the management service 202 with reference to only a few or several client devices 206. Exemplary embodiments, though, are scalable and may be applied to any number of client devices 206 and to any number of software services 204. The type of the client device 206 is immaterial and can be a stationary computer, the server 200, and/or the mobile device (such as a smartphone 224).

Figure 6:
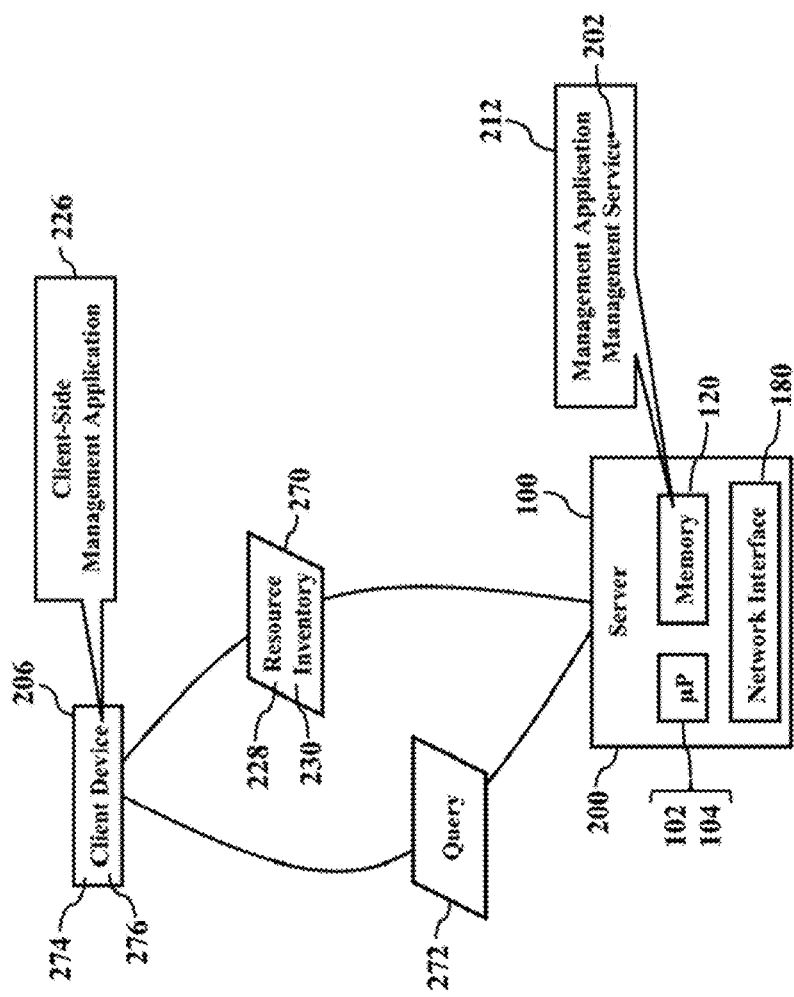
FIG. 6 is a more detailed illustration of a resource inventory, according to exemplary embodiments.

FIG. 6 illustrates a resource inventory 270, according to exemplary embodiments. Here the information handling system 100 (acting as the server 200) solicits the client device 206 (perhaps via the enterprise network 210 illustrated in FIG. 2) for its hardware capabilities 228 and/or the software capabilities 228. The server 200 executes the management application 212 stored in its memory 120. The management application 212 instructs the processors 102 and/or 104 to provide the management service 202. The management application 212, for example, causes the server 200 to send a query 272 to the client device 206. The query 272 requests the client device 206 to generate the resource inventory 270. The resource inventory 270 may be preferably generated in real time, thus providing a real time view of the hardware capabilities 228 and/or the software capabilities 228 currently available from the client device 206. The resource inventory 270, for example, may specify a processor utilization and/or a memory utilization associated with the processors 102 and 104 and the memory 120 installed in a chassis representing the client device 206. As the reader may understand, the client device 206 has one or more cards and/or components installed in the chassis, and the cards and components provide processing and memory functions. The chassis may also have one or more cards providing the network interface 180. The management application 212 may thus instruct the server 200 to randomly, periodically, or on demand request the resource inventory 270 describing any processor, memory, and networking capability available from the client device 206.

The client device 206 sends a query response. When the client device 206 receives the query 272, the client device 206 generates the resource inventory 270. The client device 206 has its own processor 274 that executes the client-side management application 226 stored in a memory device 276. When the client device 206 receives the query 272, the client-side management application 226 surveys its hardware capabilities 228 and software capabilities 228 and generates the resource inventory 270. The client-side management application 226 then instructs or causes the client device 206 to send the resource inventory 270 to the server 200. The client device 206 may format the resource inventory 270 using any standard or protocol, such as JSON, XML, or REST.

Figure 7:
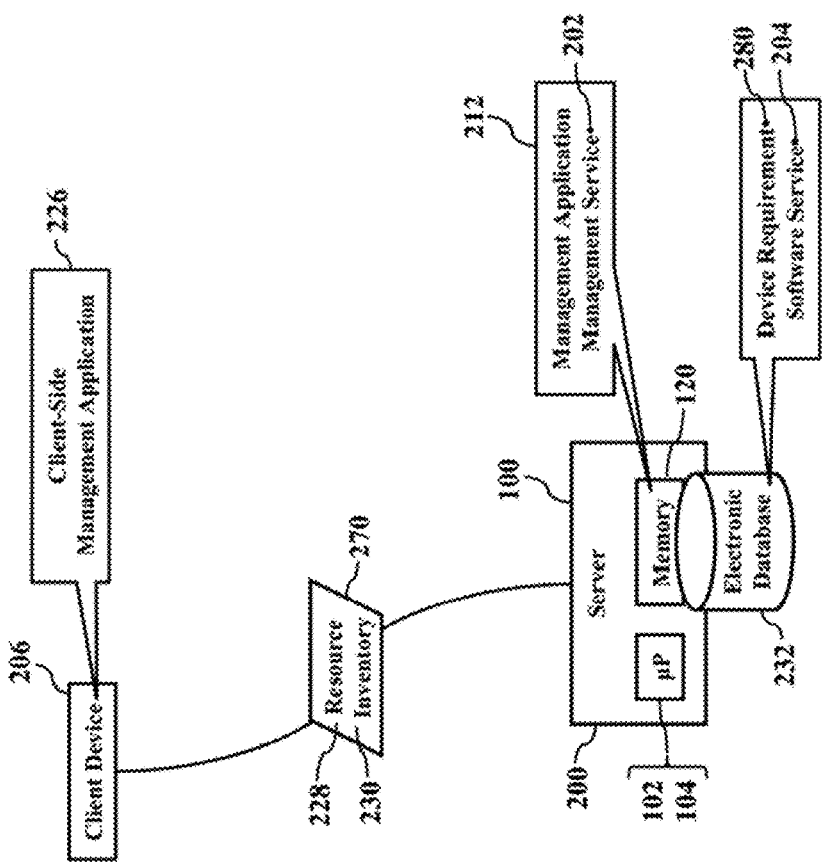
FIGS. 7-8 illustrate a database, according to exemplary embodiments.
Figure 8:
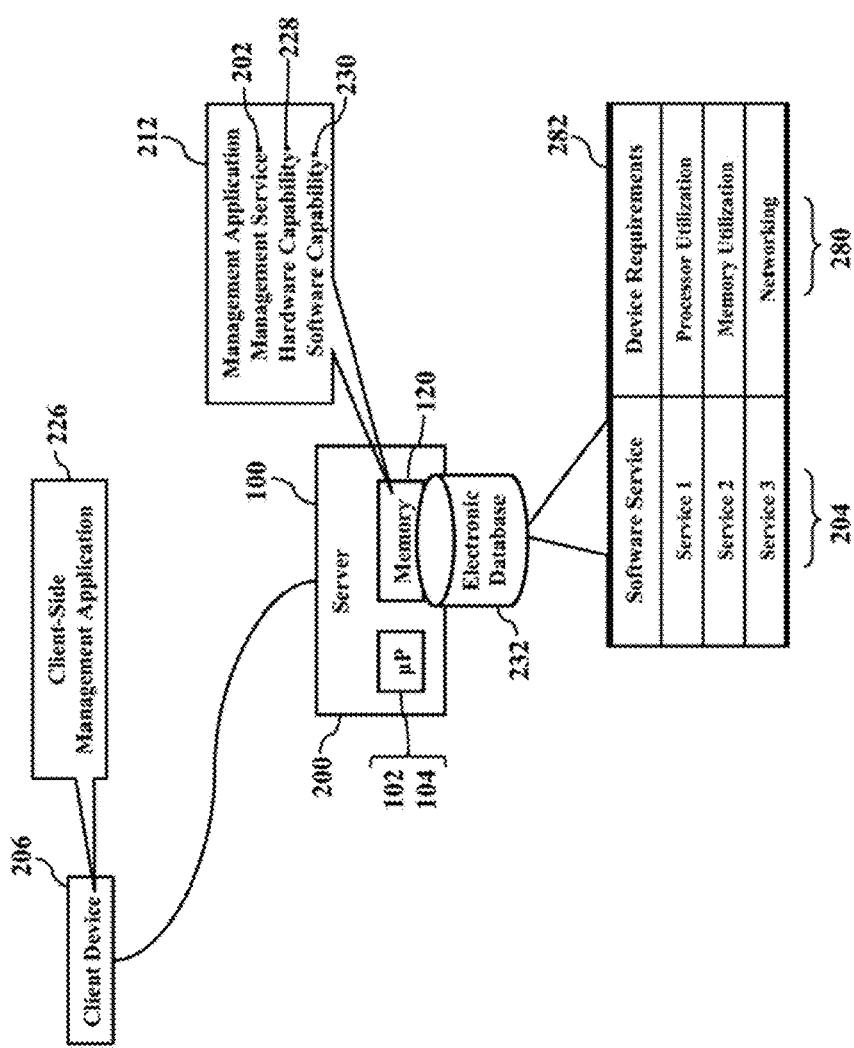
Figure 9:
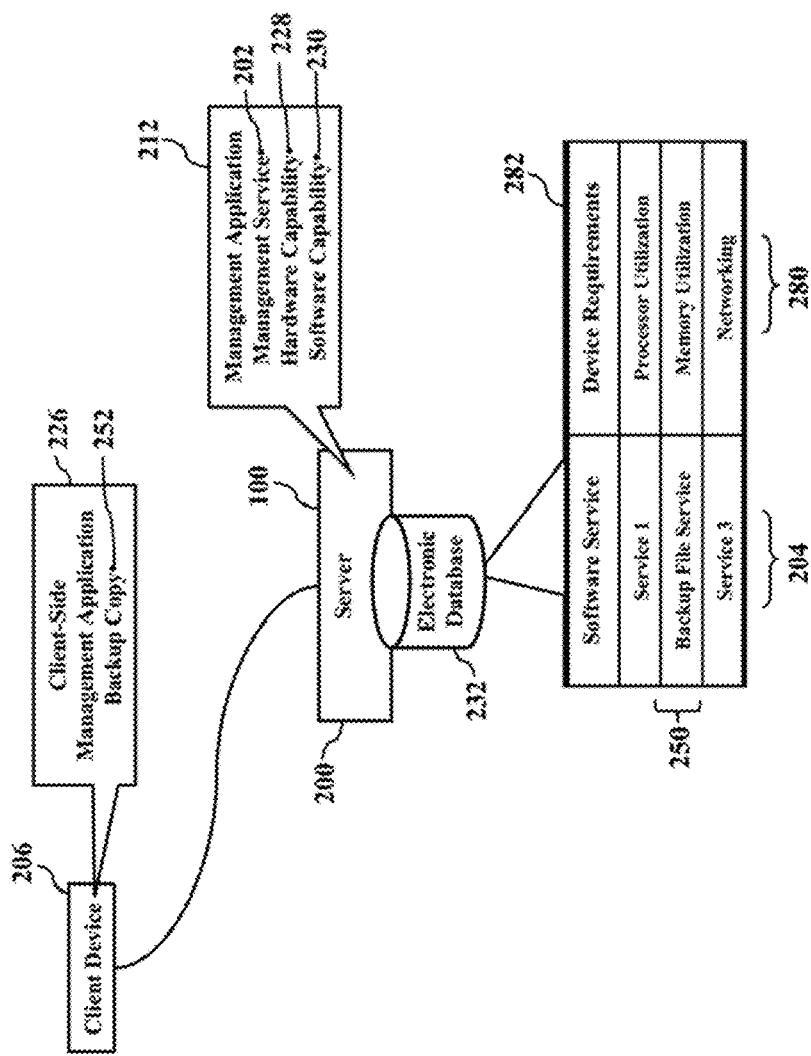
FIGS. 9-12 illustrate a backup software solution, according to exemplary embodiments.

FIGS. 7-8 further illustrate the database 232, according to exemplary embodiments. When the server 200 receives the resource inventory 270, the server 200 may consult the electronic database 232. The electronic database 232 stores information describing the one or more device requirements 280 associated with different software services 204. The database 232 may thus be populated with information or data specifying a minimum processor, memory, and/or networking requirement for executing the corresponding software service 204. The management application 212 instructs the server 200 to query the electronic database 232 for the hardware capabilities 228 and/or the software capabilities 228 specified by the resource inventory 270.

FIG. 8 further illustrates the database 232. While the database 232 may have any configuration or scheme, for simplicity FIG. 8 illustrates the database 232 as a table 282 that electronically maps, relates, or associates different software services 204 to their corresponding device requirements 280. Exemplary embodiments may thus populate the database 232 with database entries describing the minimum or desired processor, memory, networking, software, or other device requirements 280 for the corresponding software service 204. While FIG. 8 only illustrates a few entries, in practice the database 232 may contain hundreds, thousands, or even millions of entries for a large number of software services 204 provided by many service providers. The information handling system 100 may thus query the electronic database 232 for the hardware capabilities 228 and/or the software capabilities 228 specified by the resource inventory 270 and identify or retrieve any electronically associated entries. The information handling system 100 may also perform a reverse lookup in which the software service 204 reveals its corresponding device requirement(s) 280.

Exemplary embodiments may thus match client capabilities to the device requirements 280. The database 232 reveals which software service 204 is best suited to the client device 206. The hardware capabilities 228 and/or the software capabilities 228 are compared to the device requirements 280 specified in the database 232. If the hardware capabilities 228 and/or the software capabilities 228 match or satisfy any device requirements 280, then the client device 206 may be identified as a candidate for receiving, providing, or participating in the corresponding software service 204. The information handling system 100 may thus select the client device 206 for the software service 204 that best suits the hardware capabilities 228 and/or the software capabilities 228.

Exemplary embodiments may also inventory the service providers. This disclosure earlier explained that a typical enterprise customer may license or utilize many different software services 204 provided by many different service providers. For example, there may be many service providers offering competing backup software solutions (as explained with reference to FIG. 4). Each different backup solution may be tailored to, or perform best, to very specific device requirements 280. The database 232 may thus reveal which one of the software services 204 is best for the client device 206. In practice, then, the database 232 is kept up-to-date with any service provider's software service 204 and its corresponding device requirements 280. Indeed, exemplary embodiments may even query the different service providers to retrieve their latest or updated device requirements 280. Exemplary embodiments may thus ensure that the database 232 contains fresh data for constantly evolving software services 204.

Exemplary embodiments may use common calls. As exemplary embodiments build and update the electronic database 232, APIs may solicit and provide software versions for controlling the freshest service interactions, extensions, policies, and data.

FIGS. 9-12 is a more detailed illustration of the backup file service 250, according to exemplary embodiments. Again, while exemplary embodiments are applicable to any software service 204, most readers are familiar with file backup services. Here the server 200 selects the software service 204 that best suits the hardware capabilities 228 and/or the software capabilities 228 associated with the client device 206. The client device 206 may thus generate the backup copy 252 according to the backup file service 250.

Figure 10:
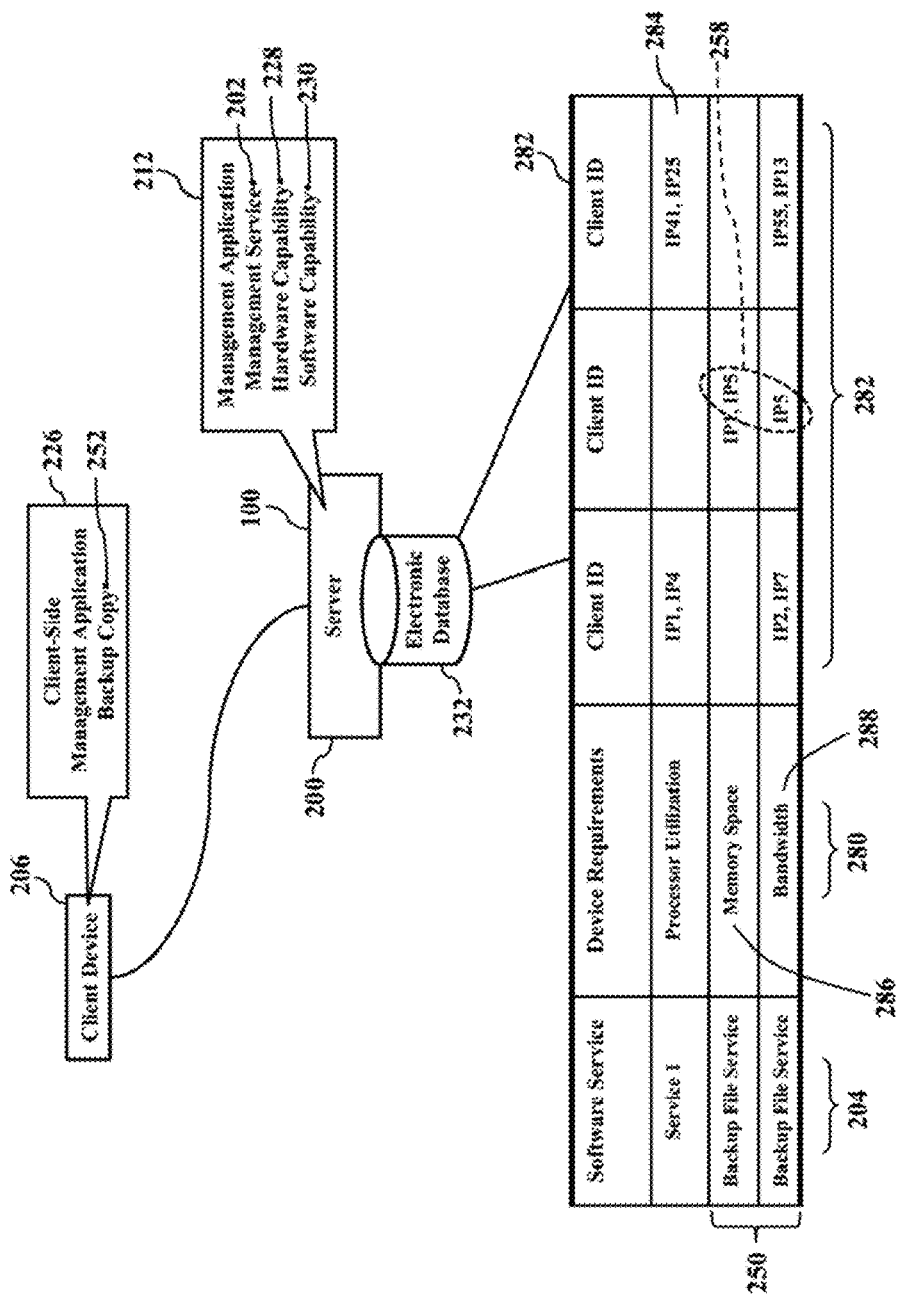

FIG. 10 illustrates more details for selecting the backup software service 250. Here the electronic database 232 may track or log the hardware capabilities 228 and/or the software capabilities 228 reported by the client device 206. For example, when the server 200 receives the hardware capabilities 228 and/or the software capabilities 228 from any client device 206, the server 200 may organize the hardware capabilities 228 and/or the software capabilities 228 according to the device requirements 280 for the software services 204. Exemplary embodiments may thus monitor which client device 206 satisfies the device requirements 280 for the corresponding software service 204. FIG. 10 thus illustrates the electronic database 232 having entries that associate a device identifier 282 to the device requirements 280 for the corresponding software service 204. The device identifier 282 may be any alphanumeric combination that uniquely identifies the client device 206. While FIG. 10 illustrates an Internet protocol address 284, any other device identifier 282 may be used.

The electronic database 232 may thus reveal at least some provisioning details. Suppose, for example, that the backup software service 250 requires a minimum memory space 286 for the backup copy 252. The information handling system 100 may also query for a networking parameter, such as a minimum network bandwidth 288 for efficiently transferring backup information. Exemplary embodiments may thus reveal the restoration device 258 (such as its unique device identifier 282 or IP5) having both the memory space 286 and the network bandwidth 288 sufficient for the backup software service 250. The restoration device 258, for example, has excess, unused, or allocable memory for saving the backup copy 252 associated with the client device 206.

Figure 11:
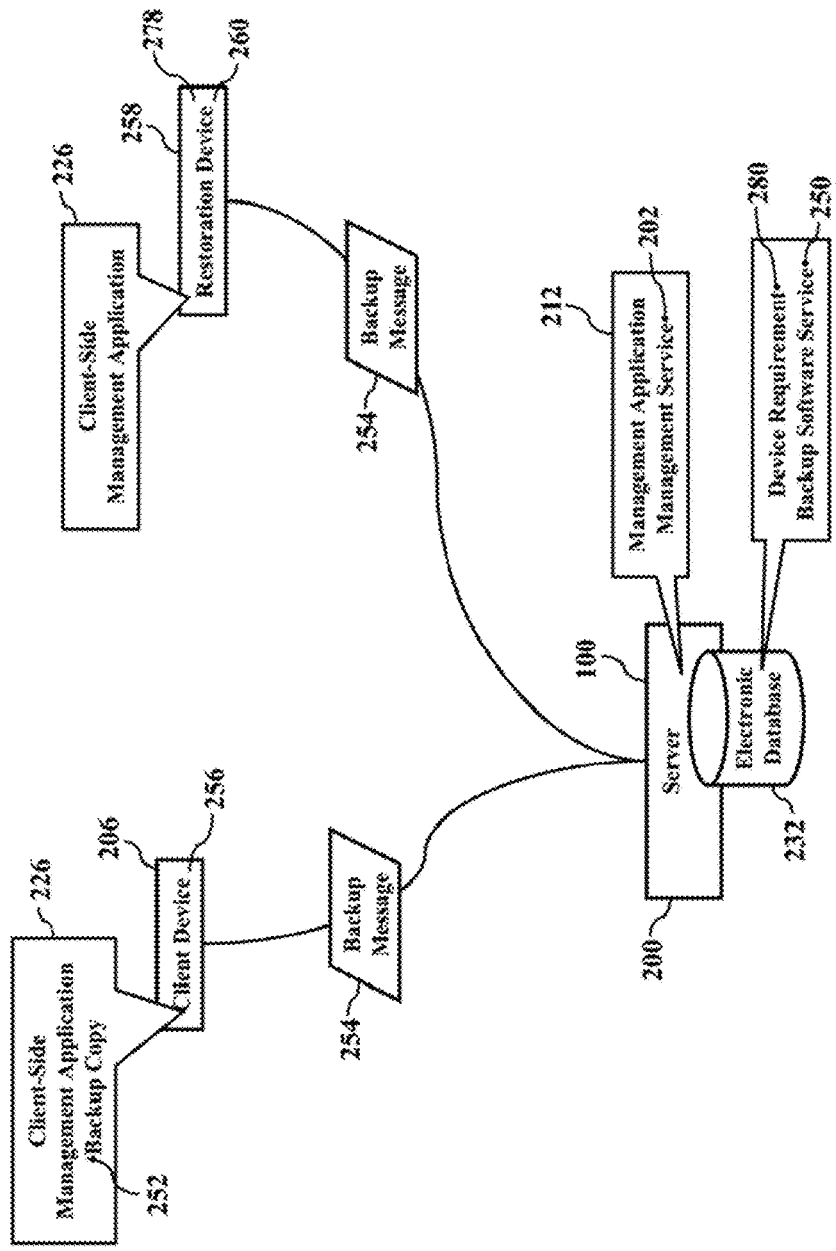

FIG. 11 illustrates a network transfer. Once the restoration device 258 is determined, exemplary embodiments may arrange the backup software service 250. The management application 212 instructs the server 200 to send the backup message 254 to the client device 206 and/or to the restoration device 258. The backup message 254 identifies the client device 206 as the source 256 for the backup software service 250. The backup message 254 may also identify the restoration device 258 as the destination 260 for the backup software service 250. The backup message 254, in other words, may identify the network addresses (such as Internet protocol addresses) for provisioning the backup software service 250. The backup message 254 may thus instruct the restoration device 258 to reserve its available memory, and the backup message 254 may instruct the client device 206 to generate the backup copy 252. The client device 206 may thus send the backup copy 252 to the network address 278 associated with the restoration device 258. The client device 206 may thus send the backup copy 252 as a stream of data to the destination device 258 providing the backup software service 250. Exemplary embodiments have thus identified a need for the backup software service 250 and automatically provisioned the details.

Figure 12:
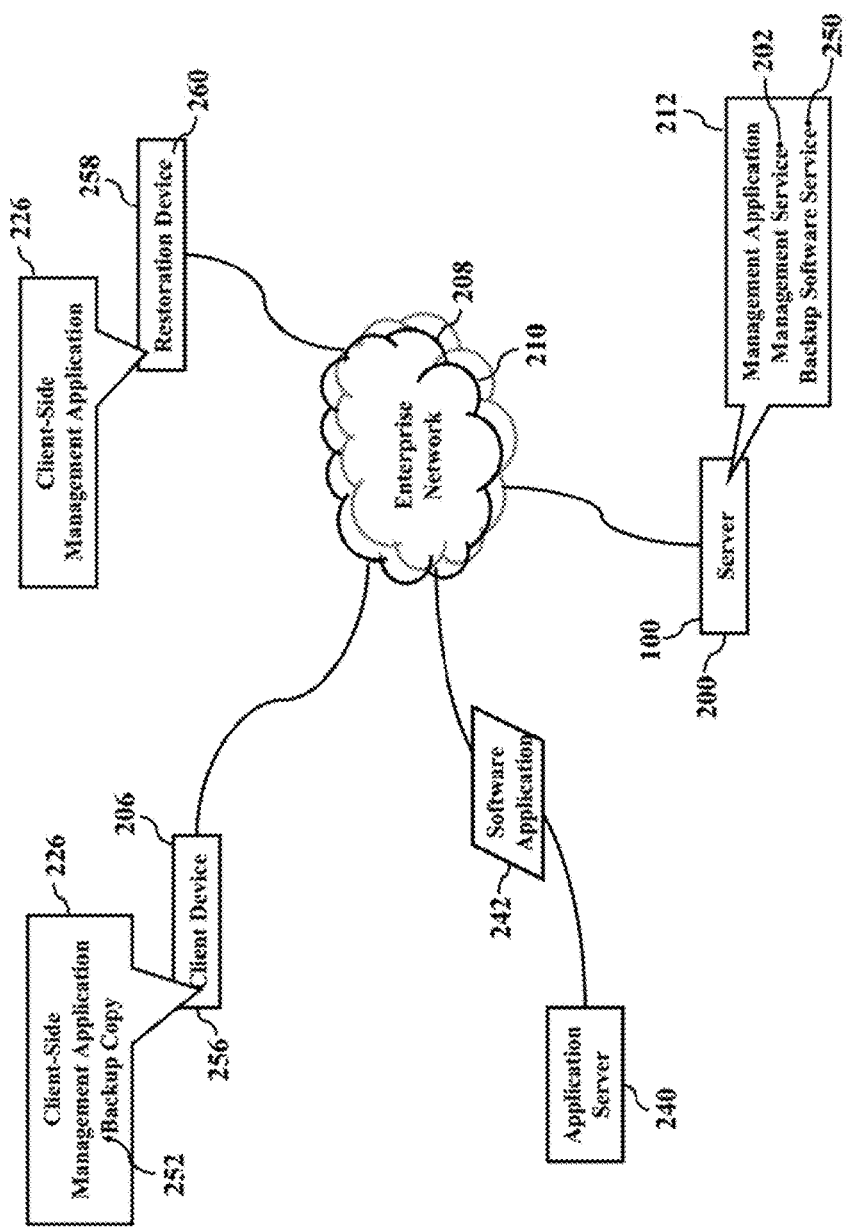

FIG. 12 illustrates software deployment. Even though exemplary embodiments have identified a need for the backup software service 250, software may be required. Again, as the reader may envision, the backup software service 250 may require the software application 242 to generate and send the backup copy 252. That is, even though the backup software service 250 has been identified, the client device 206 and/or the restoration device 258 may still lack the necessary software application 242 to implement the backup software service 250. The client device 206 and/or the restoration device 258 may thus be instructed (perhaps via the backup message 254 illustrated in FIGS. 4 and 11) to access the application server 240 via the enterprise network 210 and to download the software application 242 associated with the backup software service 250. Once the software application 242 is automatically deployed, exemplary embodiments may automatically provision the software application 242 (such as identifying the source 256, the destination 260, and their respective network addresses).

Exemplary embodiments support other intelligence. There may be many service providers offering competing software services 204 for the same or basic functionality. Again, there may be many different software applications offering the backup software service 250. Exemplary embodiments may thus select one service provider over another based on any factor or parameter. For example, the size of the backup copy 252 may winnow or narrow the candidates. A 500 GB file, for example, could not be efficiently transferred to an Internet or cloud-based location without substantial networking bandwidth. A local destination may thus be selected. The management application 212 may thus include learning algorithms, rules, and other intelligence to make service decisions and to predict service needs.

Figure 13:
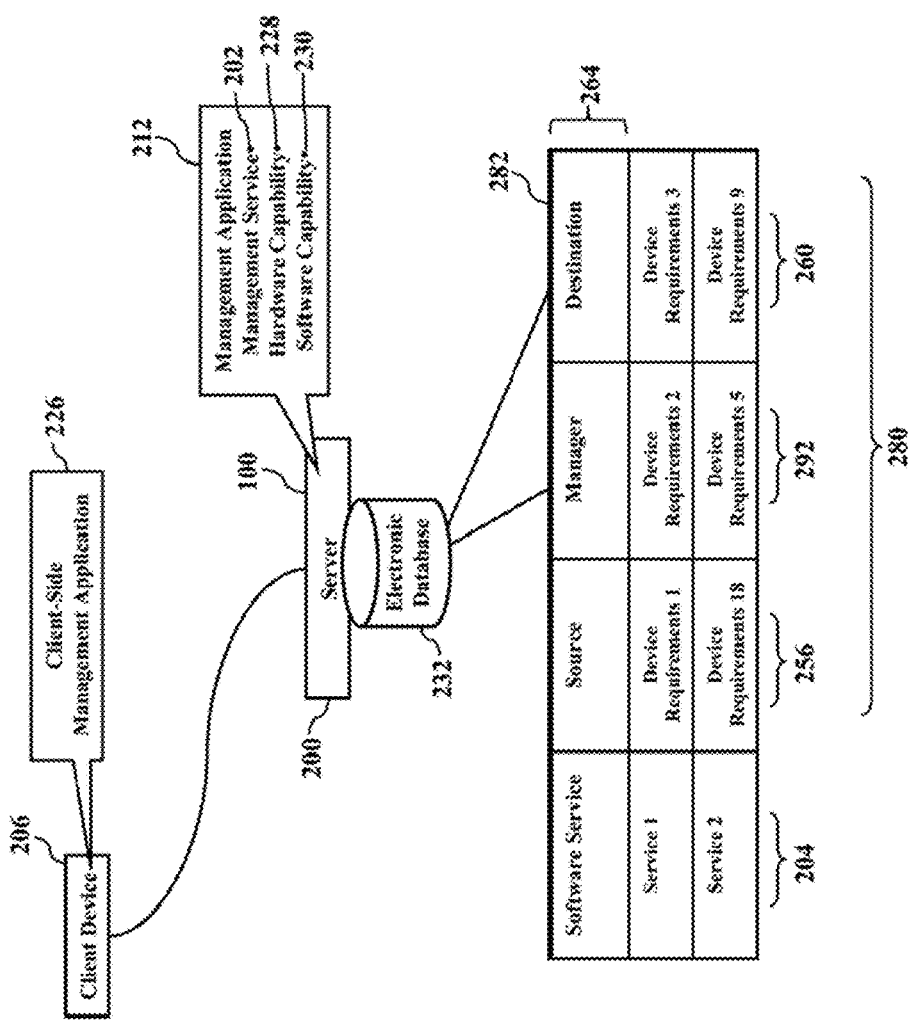
FIG. 13 illustrates role play, according to exemplary embodiments.

FIG. 13 further illustrates role play, according to exemplary embodiments. As the server 200 manages the software service 204, the client device 206 may be assigned the role 264. That is, the software service 204 may require the processing contribution of several participants, so the client device 206 may be merely an actor with a large or small role 264. While the role 264 may be simple or complex, the role 264 is perhaps determined by the hardware capabilities 228 and/or the software capabilities 230 of the client device 206. The role 264 may be simply explained as the device requirements 280 to be the source 256, a manager 292, and/or the destination 260. For example, the source 256 may specify the client device 206 as the originator of data needed for the software service 204. If the client device 206 plays the manager 292, then perhaps the client device 206 uses its hardware capabilities 228 and/or its software capabilities 230 to manage other devices providing the software service 204. If the client device 206 is assigned the destination 260, then perhaps the client device 206 receives data needed for performing at least a portion of the software service 204. When the server 200 queries the electronic database 232, the entries may also define the requirements and/or the descriptions of the role(s) 264 associated with each software service 204.

Exemplary embodiments may utilize any instrumentation. The assignment of the role 264 may use any standard or protocol. Most likely, though, the role play uses an industry standard for instrumentation, assignment, and messaging. For example, role play may use the WMI/OMI Common Information Module Object Managers (or "CIMOM") and/ or DELL commands and extensions. Exemplary embodiments describe the needed software service 204 and whether or not the corresponding role 264 is fulfilled to ensure performance.

Figure 14:
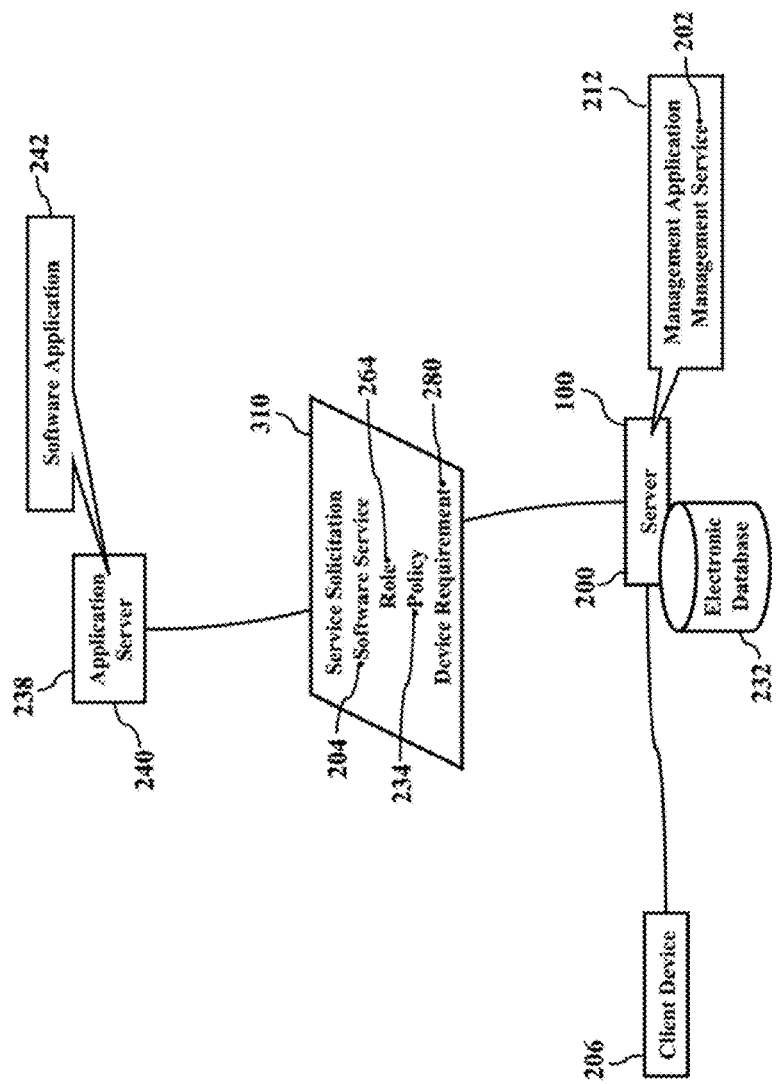
FIGS. 14-16 illustrate service solicitations, according to exemplary embodiments.

FIG. 14 illustrates service solicitations, according to exemplary embodiments. Here any service provider 238 may advertise its software service 204. That is, the service provider 238 may solicit the server 200 to select the software service 204 provided by the service provider 238. Recall that the service provider 238 may operate or associate with the application server 240 that provides the service provider's software application 242. The application server 240 may thus advertise its availability to perform the software service 204 provided by the software application 242. The application server 240 may thus send a service solicitation 310 to the network address (e.g., Internet protocol address) associated with the server 200. The service solicitation 310 may be sent as a packetized message, webpage, or any other format. Regardless, the service solicitation 310 contains data or information describing the software service 204. For example, the service solicitation 310 may describe one or more advantages and capabilities provided by the software service 204, perhaps along with any required interfaces and/or data requirements for providing the software service 204. Indeed, the service solicitation 310 may even describe the one or more roles 264 associated with the software service 204, perhaps even defining the policy 234 and/or the device requirements 280 associated with each needed actor. The service solicitation 310 may thus help the management application 212 select or assign the proper client device 206 as an agent and arrange any software deployment to accomplish endpoint missions (as previously explained). The management application 212 is thus able to inspect and evaluate the software service 204, perhaps based on any service specification or definition described by the service solicitation 310.

Exemplary embodiments may also populate the electronic database 232. When the information handling system 100 receives the service solicitation 310, the management application 212 may cause the information handling system 100 to add entries to the electronic database 232. Because the service solicitation 310 contains data or information describing the software service 204, entries may be added to describe the roles 264, the policy 234, and/or the device requirements 280 associated with each needed actor in the software service 204. Exemplary embodiments, in other words, may rely on the service provider 238 to both advertise its the software service 204 and also to define its software service 204 in the electronic database 232.

Figure 15:
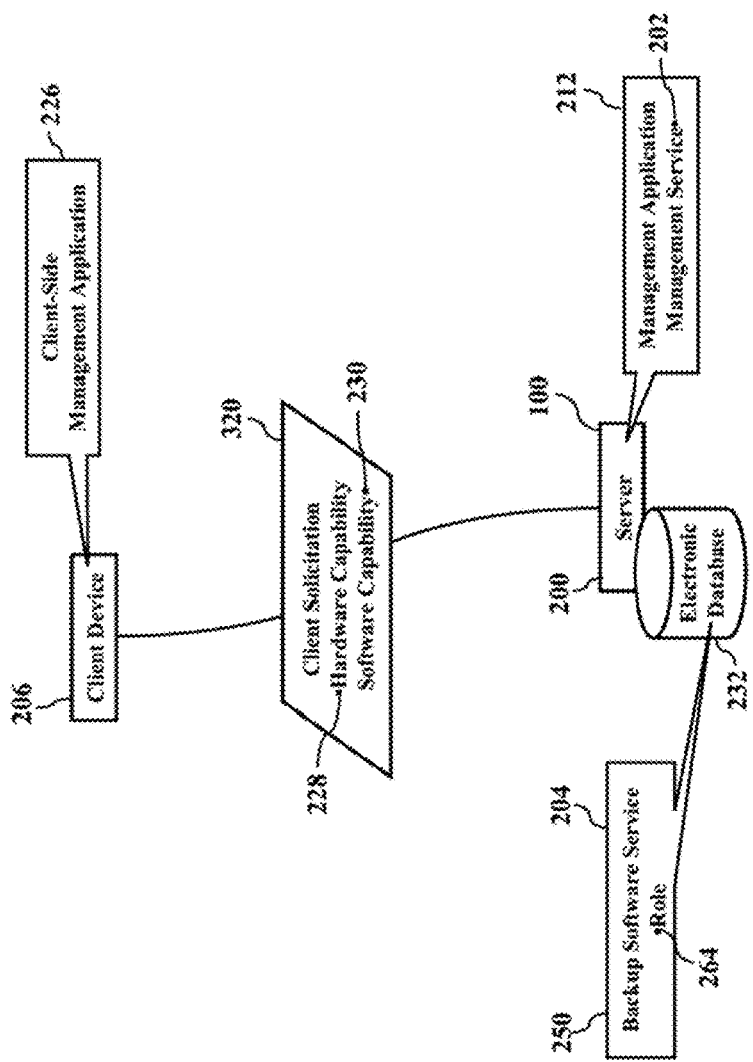
Figure 16:
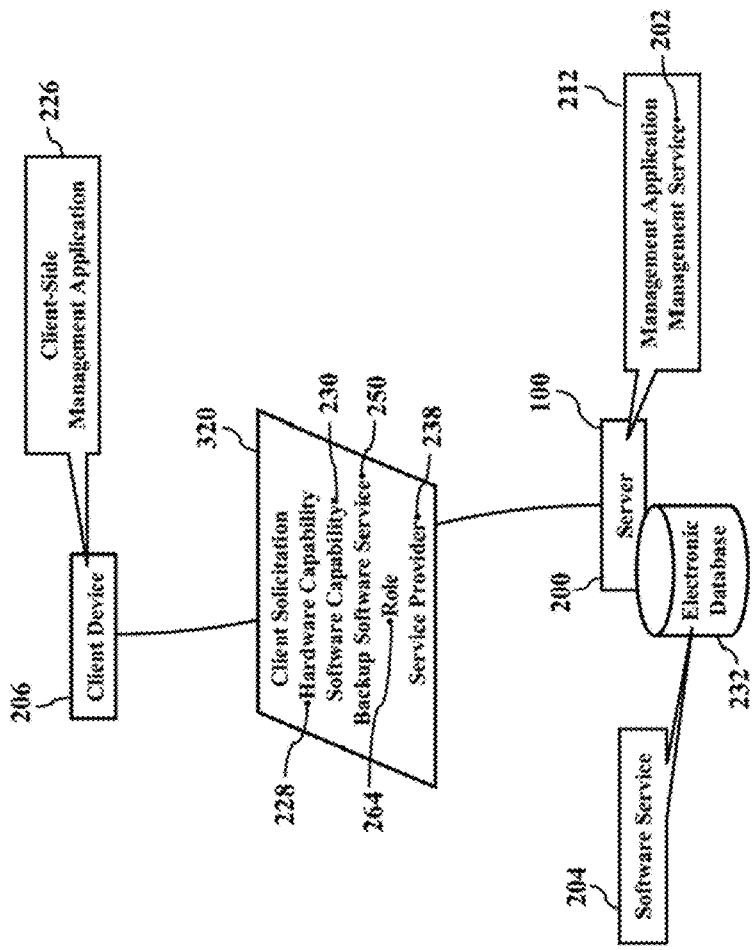

FIGS. 15-16 illustrate client solicitations, according to exemplary embodiments. Here the client device 206 may advertise its availability for performing any software service 204. That is, the client device 206 may volunteer to perform any function or mission (such as the role 264 in the software service 204, as FIG. 13 illustrated). Suppose, for example, that the client device 206 has excess utilization of its processor, memory, and/or software capabilities. Rather than remaining underutilized or even idle, exemplary embodiments may instruct the client device 206 to proactively seek out processing tasks. The client-side management application 226 may thus cause the client device 206 to advertise its hardware capabilities 228 and/or its software capabilities 230. The client device 206, for example, may thus send a client solicitation 320 to the network address (e.g., Internet protocol address) associated with the information handling system 100 (acting as the server 200). The client solicitation 320 may be sent as a packetized message, webpage, or any other format. Regardless, the client solicitation 320 contains data or information describing the current hardware capabilities 228 and/or its software capabilities 230. The client solicitation 320 may be sent in addition to, or more frequent than, the resource inventory 270 (explained with reference to FIGS. 6-7). The client solicitation 320 may thus dynamically and in real time allow the management application 212 to maintain an accurate inventory of network resources. The management application 212 may thus nearly immediately select or assign the role 264 to the client device 206, based on the hardware capabilities 228 and/or its software capabilities 230.

The backup software service 250 provides another example. Suppose the client device 206 surveys its hardware capabilities 228 and/or its software capabilities 230 and determines that excess memory space is available. The client-side management application 226 may thus instruct the client device 206 to generate the client solicitation 320 that advertises the excess memory space as one of the hardware capabilities 228 and/or its software capabilities 230. The client device 206 sends the client solicitation 320 to the server 200 for evaluation. The management application 212 may thus query the electronic database 232 to determine which software service 204 best suits the excess memory space available from the client device 206. While the excess memory space may be used for any software service 204, suppose the management application 212 chooses the backup software service 250. The management application 212, in other words, determines that the excess memory space is best fulfilled by playing the role 264 associated with backing up some other networked device or location. The management application 212 may thus provision and deploy the backup software service 250, as previously explained.

As FIG. 16 illustrates, the client device 206 may even be more specific. Once the client device 206 determines its hardware capabilities 228 and/or its software capabilities 230, the client device 206 may even suggest or specify the software service 204. Suppose, for example, that the client device 206 has the excess memory space. However, the client device 206 may request that the excess memory space be dedicated to the backup software service 250. That is, perhaps the client device 206 already has a spare storage partition defined and available as \\<devicename>\backupstorage. Perhaps also the client-side management application 226 determines a percentage of storage that is reserved for the backup software service 250. Exemplary embodiments, in other words, may preconfigure or predefine available resources for a particular software service 204. When the client device 206 sends client solicitation 320, the client solicitation 320 may reserve or specify that the excess memory space be dedicated to a particular backup software service 250. The client device 206, in other words, may specify or even require that its excess resources be used for a preconfigured or predefined role 264 in the backup software service 250. Indeed, the client solicitation 320 may even specify the service provider 238 that provides the backup software service 250, thus further limiting decisional authority. When the information handling system 100 receives the client solicitation 320, the management application 212 may thus be required to adhere to the demands of the client device 206. The management application 212 may thus be forced to select or assign the role 264 in the backup software service 250 provided by the service provider 238, as specified by the client device 206.

Figure 17:
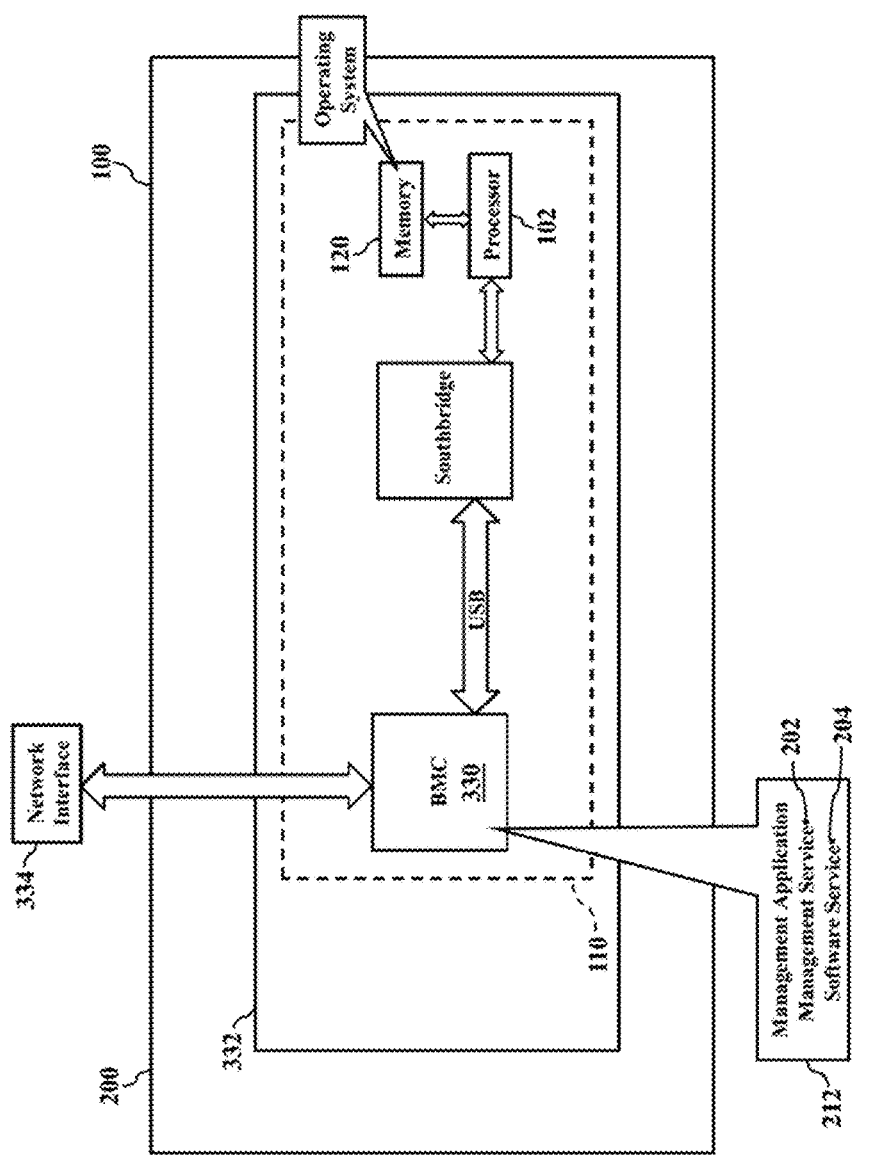
FIG. 17 illustrates service management by a baseboard management controller, according to exemplary embodiments.

FIG. 17 further illustrates service management, according to exemplary embodiments. Here a baseboard management controller (or "BMC") 330 may execute the management application 212 to provide the management service 202. When the information handling system 100 is configured as the server 200, the server 200 may be remotely managed, perhaps according to the Intelligent Platform Management Interface (or "IPMI") specification. That is, the server 200 has a motherboard 332 comprising the chipset 110. However, the server 200 may also have the separate baseboard management controller 330. As those of ordinary skill in the art understand, the baseboard management controller 330 interfaces with the motherboard 332 to provide side-band and out-of-band remote management of the host server 200. The baseboard management controller 330 has one or more physical communications links and interfaces to the motherboard 332, thus allowing the baseboard management controller 330 to process messages according to the IPMI specification. The baseboard management controller 330 may thus monitor and report the functions and performance of the server 200 via a separate network interface 334 to the enterprise network 210 (illustrated in FIG. 2). The IPMI specification is generally well known and thus need not be explained in detail. The baseboard management controller 330 may thus manage the software services 204, as explained herein.

Exemplary embodiments include a fee structure. Whenever the management application 212 selects the software service 204, a fee may be charged or incurred. Whenever the electronic database 232 is queried, a fee may be charged or incurred. Each assignment of any role 264 may also incur a fee. The fee structure, of course, may be uniquely tailored to suit each service provider, customer, or situation.

Figure 18:
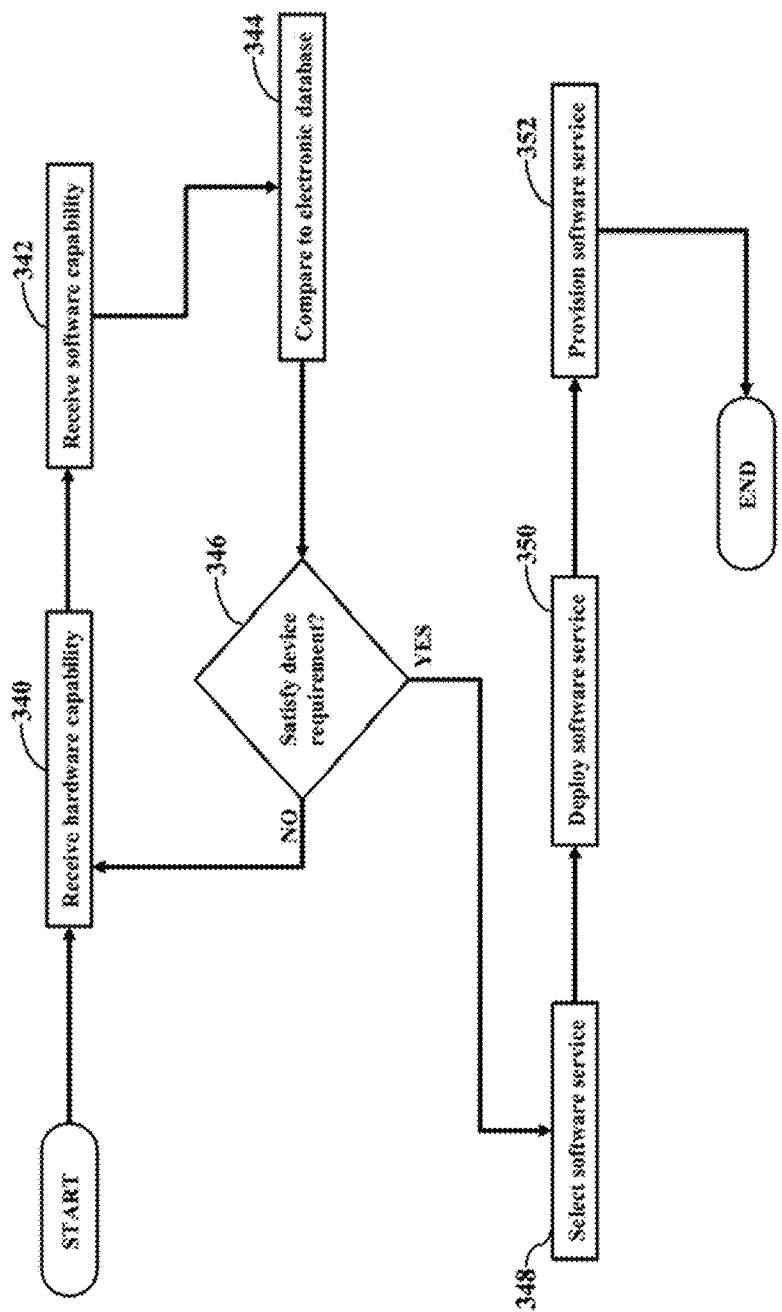
FIG. 18 illustrates a method or process for service management, according to exemplary embodiments.

FIG. 18 illustrates a method or process for service management, according to exemplary embodiments. The hardware capabilities 228 (Block 340) and/or the software capabilities 230 (Block 342) are received and compared to the electronic database 232 (Block 344). If the hardware capabilities 228 and/or the software capabilities 230 satisfy the device requirements 280 (Block 346), the corresponding software service 204 is selected (Block 348), deployed (if necessary) (Block 350), and provisioned (Block 352).

Exemplary embodiments may packetize. The information handling system 100, the client device 206, the restoration device 258, and the baseboard management controller 330 may interface with the enterprise network 210, a local area network, and/or a wide area network (such as the Internet). Messages and data may be packetized into packets of data according to a packet protocol, such as the Internet Protocol. The packets of data contain bits or bytes of data describing the contents, or payload, of a message. A header of each packet of data may contain routing information identifying an origination address and/or a destination address. There are many different known packet protocols, and the Internet Protocol is widely used, so no detailed explanation is needed.

Exemplary embodiments may be applied regardless of networking environment. Exemplary embodiments may be easily adapted to stationary or mobile devices having cellular, WI-FI®, near field, and/or Bluetooth® capability.

Exemplary embodiments may be applied to devices utilizing any portion of the electromagnetic spectrum and any signaling standard such as the IEEE 802 family of standards, GSM/CDMA/TDMA or any cellular standard, and/or the ISM band. Exemplary embodiments, however, may be applied to any processor-controlled device operating in the radio-frequency domain and/or the Internet Protocol (IP) domain. Exemplary embodiments may be applied to any processor-controlled device utilizing a distributed computing network, such as the Internet (sometimes known as the World Wide Web), an intranet, the local-area network (LAN), and/or a wide-area network (WAN). Exemplary embodiments may be applied to any processor-controlled device utilizing power line technologies, in which signals are communicated via electrical wiring. Indeed, exemplary embodiments may be applied regardless of physical componentry, physical configuration, or communications standard(s).

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a consumer electronic device, a network server or storage device, a switch router, wireless router, or other network communication device, a network connected device (cellular telephone, tablet device, etc.), or any other suitable device, and can vary in size, shape, performance, price, and functionality.

The information handling system can include memory (volatile (e.g. random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a device, such as a Pentium class or PowerPC™ brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method of deploying a software service, comprising:
receiving, by an information handling system, a resource advertisement via an enterprise network from a client device, the resource advertisement requesting a resource and specifying a memory utilized by the client device;
querying, by the information handling system, an electronic database for the memory utilized by the client device, the electronic database electronically associating software services to device requirements including the memory utilized by the client device;

identifying, by the information handling system, one of the software services in the electronic database that is electronically associated with the memory utilized by the client device;

determining, by the information handling system, a vendor of the software service that satisfies the resource requested by the client device and the memory utilized by the client device;

determining, by the information handling system, a network address associated with the vendor of the software service that satisfies the resource requested by the client device and the memory utilized by the client device;

instructing, by the information handling system, the client device to download a software application via the enterprise network from the address associated with the vendor, the software application when locally executed causing the client device to cooperate to execute the software service in response to the resource advertisement requesting the resource;

assigning, by the information handling system, a role to the client device, the role based on a policy associated with the software application, the role of different roles assigned to client devices to cumulatively execute the software service based on resource inventories sent from the client devices that advertise their hardware capabilities and software capabilities; and wherein the utilization of the software service requires authentication and/or affiliation.

2. The method of claim 1, further comprising identifying the network address from the electronic database that is electronically associated with the software service.

3. The method of claim 1, further comprising receiving a hardware capability of the hardware capabilities associated with the client device.

4. The method of claim 1, further comprising receiving a software capability of the software capabilities associated with the client device.

5. The method of claim 1, further comprising receiving a client solicitation from the client device, the client solicitation specifying the memory utilized by the client device.

6. The method of claim 1, further comprising receiving a service solicitation from the software service, the service solicitation specifying the memory utilized by the client device.

7. An apparatus, comprising:
a hardware processor; and
a memory device accessible to the hardware processor, the memory device storing instructions that when executed cause the hardware processor to perform operations including:
receiving a resource inventory via an enterprise network from a client device, the resource inventory specifying a memory utilized by the client device;
querying an electronic database for the memory utilized by the client device, the electronic database electronically associating remotely hosted software applications provided by service providers and device requirements including the memory utilized by the client device;
determining if the memory utilized by the client device satisfies a device requirement of the device requirements electronically associated by the electronic database;
identifying a remotely hosted software application of the remotely hosted software applications from the electronic database, the remotely hosted software application electronically associated with the memory utilized by the client device;
retrieving a network address from the electronic database, the network address associated with the remotely hosted software application;
instructing the client device to download the remotely hosted software application via the network address, the remotely hosted software application when downloaded causing the client device to locally cooperate to execute a software service;
assigning a role to the client device, the role based on a policy associated with the remotely hosted software application, the role of different roles assigned to client devices to cumulatively execute the software service based on resource inventories sent from the client devices that advertise their hardware capabilities and software capabilities; and
wherein the utilization of the software service requires authentication and/or affiliation.

8. The system of claim 7, wherein the operations further comprise receiving a client solicitation from the client device, the client solicitation specifying the memory utilized by the client device.

9. The system of claim 7, wherein the operations further comprise receiving a service solicitation associated with the remotely hosted software application, the service solicitation specifying the memory utilized by the client device.

10. The system of claim 7, wherein the operations further comprise electronically associating the remotely hosted software application to the device requirement in the electronic database.

11. A memory device storing instructions that when executed cause a hardware processor to perform operations, the operations comprising:
receiving a resource inventory via an enterprise network from a client device, the resource inventory specifying a memory utilized by the client device;
querying an electronic database for the memory utilized by the client device, the electronic database electronically associating remotely hosted software services and device requirements including the memory utilized by the client device;
determining if the memory utilized by the client device specified by the resource inventory satisfies a device requirement of the device requirements electronically associated by the electronic database;
identifying a remotely hosted software service of the remotely hosted software services from the electronic database, the remotely hosted software service electronically associated with the memory utilized by the client device;
retrieving a network address from the electronic database, the network address associated with the remotely hosted software service;
instructing the client device to download a software application via the network address associated with the remotely hosted software service, the software application when executed causing the client device to cooperatively execute the software service;
assigning a role to the client device, the role based on a policy associated with the software application, the role of different roles assigned to client devices to cumulatively execute the software service based on resource inventories sent from the client devices that advertise their hardware capabilities and software capabilities; and wherein the utilization of the software service requires authentication and/or affiliation.

\* \* \* \* \*